United States Patent [19]

Wright et al.

[11] Patent Number: 5,329,350
[45] Date of Patent: Jul. 12, 1994

[54] MEASURING LASER BEAM PARAMETERS USING NON-DISTORTING ATTENUATION AND MULTIPLE SIMULTANEOUS SAMPLES

[75] Inventors: David L. Wright, Redwood City; John M. Fleischer, San Jose, both of Calif.

[73] Assignee: Photon, Inc., Santa Clara, Calif.

[21] Appl. No.: 887,369

[22] Filed: May 21, 1992

[51] Int. Cl.$^5$ ............................................. G01J 1/42
[52] U.S. Cl. .................................... 356/218; 356/222; 356/225; 356/234; 359/856; 359/857
[58] Field of Search ............... 356/218, 222, 225, 234; 359/856, 857

[56] References Cited

U.S. PATENT DOCUMENTS

| | | | |
|---|---|---|---|
| 3,538,335 | 11/1970 | Tartanian | 250/201 |
| 3,790,290 | 2/1974 | Müller et al. | 356/195 |
| 3,942,899 | 3/1976 | Longhenry | 356/234 |
| 3,977,793 | 8/1976 | Trotta | 356/218 |
| 4,018,535 | 4/1977 | Cason, III | 356/218 |
| 4,037,959 | 7/1977 | Bumgardner | 356/73 |
| 4,260,255 | 4/1981 | Wachs et al. | 356/222 |
| 4,626,685 | 12/1986 | Pitalo et al. | 250/341 |
| 4,842,404 | 6/1989 | Duda | 356/218 |
| 4,925,273 | 5/1990 | Maisenbacher et al. | 350/315 |
| 4,927,266 | 5/1990 | Sugiura et al. | 356/243 |
| 5,004,338 | 4/1991 | Morrow | 356/218 |
| 5,064,284 | 11/1991 | Johnston, Jr. et al. | 356/121 |
| 5,078,491 | 1/1992 | Johnston, Jr. | 356/121 |

OTHER PUBLICATIONS

Fleischer, John, "ATP; Continuously Variable Attenuator For Laser Profiles", Laser Energy Distribution Profiles: Measurement and Applications (SPIE vol. 1834) (Nov. 1992); entire document.

Primary Examiner—Robert J. Warden
Assistant Examiner—Krisanne M. Thornton
Attorney, Agent, or Firm—Thomas Carl Feix

[57] ABSTRACT

An optical system for the attenuation of laser light for measurement purposes which includes four logical subassemblies including a first attenuator subassembly for the attenuation of high power laser light, a second attenuator subassembly for lower power attenuation of the laser light, a third lens subassembly for collecting beam size data simultaneously at multiple locations in space, and a fourth logical subassembly including a beam measuring assembly for recording the beam size data received from the lens subassembly for analysis of the beam characteristics. The first attenuator subassembly is provided with a pair of reflecting, opposed facing, fixed wedges. The reflecting wedges are selectively tilted to eliminate interference effects between their inward facing reflecting surfaces. The second attenuator subassembly further includes a pair of opposed facing and movable wedges arranged in series with a fixed filter. The lens subassembly includes a positive optical lens for focusing the beam into a series of beam splitters which redirect the beam data for simultaneous collection on a beam measuring assembly. The beam measuring assembly preferably also includes a fixed filter disposed in front of the light collection surface.

32 Claims, 2 Drawing Sheets

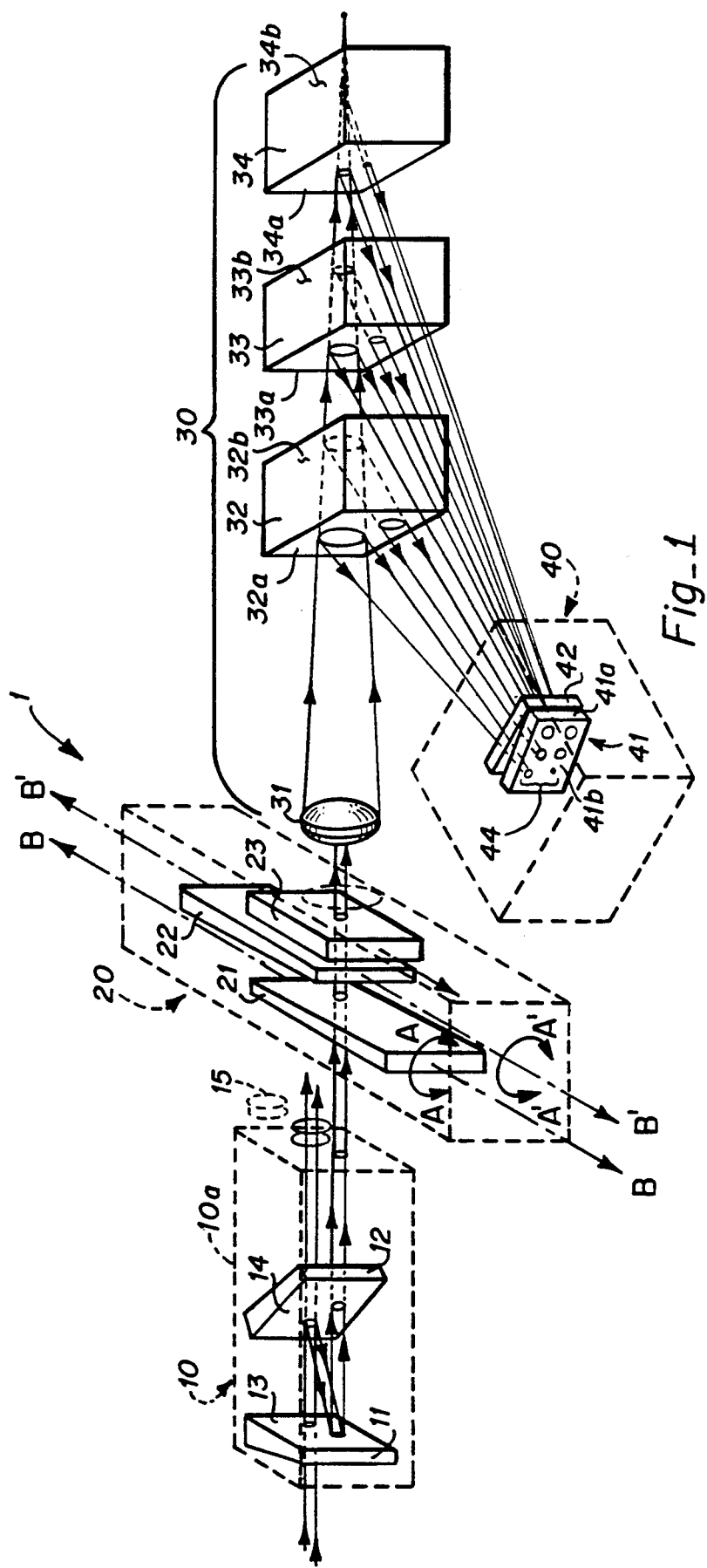
Fig_1

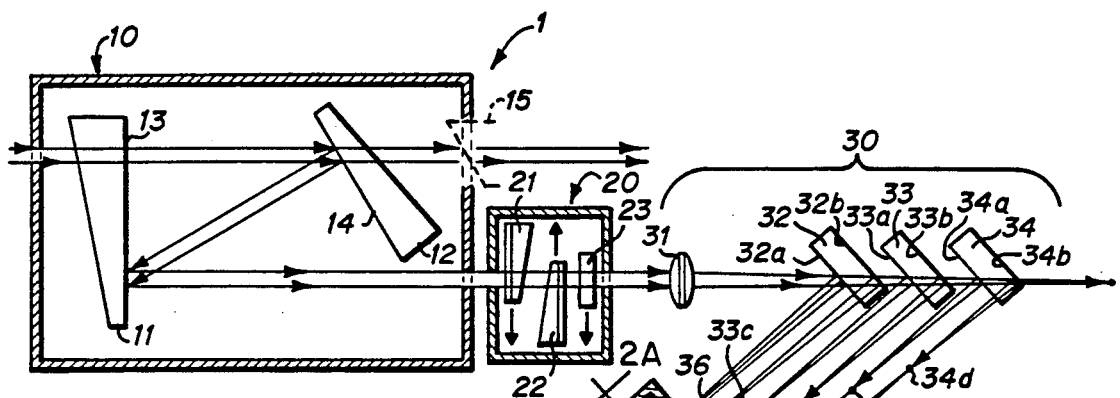
*Fig._2*
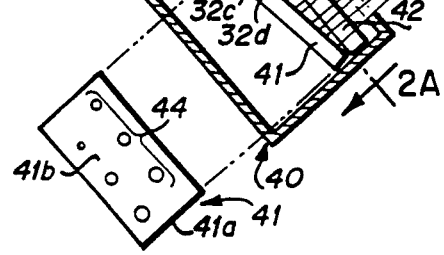
*Fig._2A*
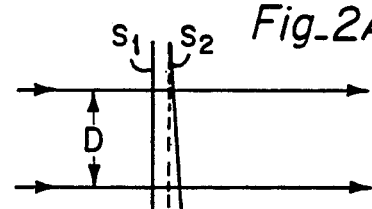
*Fig._3*   $\theta = ARCTAN\left(\dfrac{N}{D} \cdot \dfrac{\lambda}{2}\right)$ WHERE D>L
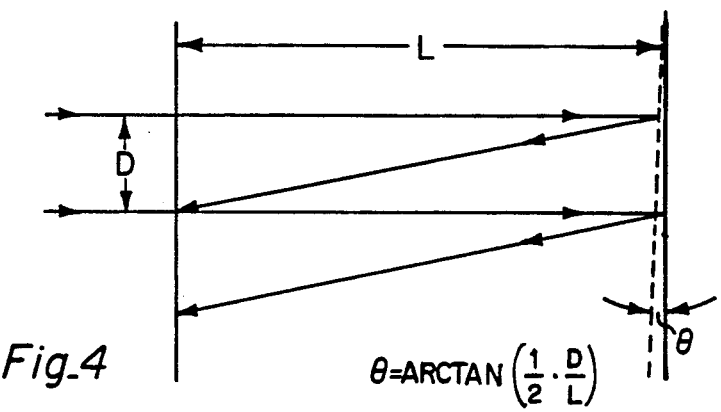
*Fig._4*   $\theta = ARCTAN\left(\dfrac{1}{2} \cdot \dfrac{D}{L}\right)$ WHERE D<L

MEASURING LASER BEAM PARAMETERS USING NON-DISTORTING ATTENUATION AND MULTIPLE SIMULTANEOUS SAMPLES

BACKGROUND OF THE INVENTION

1. Field of the Invention

The present invention relates generally to systems for controlling the transmission of light. More particularly, the present invention relates to an apparatus and method for attenuation of laser light without disturbing the relative distribution of light intensities across the beam.

2. Brief Description of the Prior Art

When making measurements of the width of laser beams, and their propagating parameters, there is a need for large amounts of attenuation of the laser light. This is because lasers concentrate a large amount of light power in small beams so that normal light detecting devices are strongly overloaded by most common laser sources.

The necessary attenuation must be accomplished without disturbing the relative distribution of the light intensities across the beam in order to make meaningful measurements of the laser beam parameters.

Further, in the case of pulse lasers in particular, it is necessary to collect samples of the beam at three (3) or more positions in space simultaneously so that the propagating parameters of a single pulse of laser light can be determined.

An unusual property of laser light, compared to more common and well-known light sources, is called its "long coherence". This means that laser light maintains a very pure wave characteristic over much longer distances than common light sources. That is, the laser light "wavetrain" maintains a uniform frequency and phase over a broad space transverse to the direction of propagation.

These pure waves, if combined together from the various reflections of an optical system, cause what are called "interference" effects. As generally defined, interference of waves is the process whereby two or more waves of the same frequency or wavelength combine to form a wave whose amplitude is the sum of the amplitudes of the interfering waves. This translates into regular increases and decreases of the light intensity across the laser beam. Pure waves in an optical system may travel over different path lengths and may have either the same wave-timing or opposite wave-timing. Thus, for two waves having the same wave-timing, their wave peaks add together and the light intensity increases. For two waves having opposite wave-timing, the peaks of the first wave coincide with the troughs of the second wave and the waves cancel each other and the light intensity decreases.

The commonly available optical attenuators of the prior art were originally developed for use with ordinary or "impure" light. Such light has a very short coherence length, typically only small fractions of a millimeter. The ordinary impure light waves can only cause interference effects over very short distances. Because of this, reflections in ordinary optical systems do not cause perceptible interference effects. Most optical system reflections are separated by much greater distances than a fraction of a millimeter; the reflections cause some reduction of the ordinary light passing through an ordinary light optical system but do not cause local fluctuations of the light.

The need for substantial attentuation of laser beams for measurement purposes requires a number of attenuators in the optical system. Also, these attenuators should be variable in order to accommodate a wide range of laser powers and beam sizes. It is also necessary that none of these attenuators cause interference effects or other distortions of the output beam.

In addition to interference effects, ordinary optical attenuators may be heated by the laser beam itself causing local optical distortion of the beam or even destruction of the attenuator itself.

The prior art recognizes some of the difficulties outlined above but a complete solution has not yet been presented. The costs of some of the partial solutions made available to this time are unnecessarily high or distort the beam in some manner.

U.S. Pat. No. 4,925,273 issued to Maisenbacher et al., recognizes the need to avoid interference effects in a single attenuator and does so by tilting the outgoing surface of the attenuator with respect to the incoming surface of the attenuator so that the light reflected at the outgoing surface is reflected away from the optical path of the incoming beam. Maisenbacher also teaches to leave the incoming surface of the attenuator uncoated so that a strong interference occurs between the orthogonal attenuator surface and the output mirror of the laser itself. However, the minimum degree of tilting necessary to achieve a desired result and avoid other undesirable effects is not addressed. Further, Maisenbacher does not address the more important need to control the interference effects between successive attenuators positioned in series.

The strongest interference effects in an optical system which is composed of successive attenuators occur between the outward facing surfaces of adjacent optical parts. The interference effect within a neutral density (N.D.) attenuator is reduced by the internal attenuation.

U.S. Pat. No. 3,942,899, issued to Longhenry discloses a calibrating device for a photometering analyzer for measuring light scattering characteristics of bacterial colony samples. The calibrating devices include a wedged shaped piece of neutral density glass to obtain continuously variable attenuation. The Longhenry patent does not consider that the wedged attenuator introduces a uniform change of attenuation across the beam along the direction where the wedge thickness is changing, thus changing its intensity distribution.

U.S. Pat. No. 3,538,335, issued to Tartanjan discloses the use of a neutral density filter comprising two variable attenuators, oriented in opposed fashion, which are adapted to cancel the change of attenuation across a light beam transmitted therethrough. In a first embodiment, the attenuators are optical discs which vary linearly in optical density with angular displacement. The discs are counter rotated with respect to each other to achieve a neutral density filter. Tartanian also suggest to substitute in place of one of the discs a single neutral density wedge which is fixed in position and varying in neutral density. In a second embodiment, the filter comprises a pair of opposed facing film segments, each of which vary in opacity from one extreme to another and are oriented with respect to each other such that the attenuation is uniform through the filter. Tartanian does not address the need for avoiding interference effects between the successive attenuators of the filter, nor is there any teaching or suggestion for selecting a particular wedge angle to overcome interference effects when a fixed wedge attenuator is proposed. Also the cost advantage of fabricating the variable attenuators from neutral density glass is neither recognized nor addressed in this patent.

When measuring high power lasers the general need to avoid absorption in the first attenuation steps has been recognized by many workers in the field. For example, strongly-wedged single beam-splitter product, Model LBS-100, has been offered by Spiricon Corporation of Logan, Utah, for this application. However, this single splitter changes the direction of the beam substantially. This means that the beam can not be used for its intended purpose while being measured, unless the entire optical train is rearranged. The strong wedge also alters the size of the beam in one axis.

From U.S. Pat. Nos. 5,064,284 and 5,078,491, both issued to Johnson, there is disclosed an apparatus for laser mode "quality" measurement which is suitable for continuous wave lasers. This apparatus is not useful for measuring single laser pulses, since the beam size data is not collected simultaneously at multiple positions in space. There is no mention of the need to avoid interference effects in and between the optical elements.

To solve the various subtle problems and requirements for attenuating laser light for beam measurement purposes, a new and useful system of special optical attenuators, and their appropriate combination, is here proposed.

The system to be described herein provides both a non-distorting wide-range attenuation method and the simultaneous measurement of the beam at multiple positions using a non-distorting attenuation method.

SUMMARY OF THE INVENTION

List of Objectives

It is therefore a principal objective of the present invention to provide a novel optical system for attenuating laser light for beam measurement purposes which overcomes the problems of the prior art.

It is another object of the invention to provide a method for attenuating a laser beam for beam measurement purposes wherein the relative distribution of light intensities across the beam is preserved.

Briefly, a preferred embodiment of the present invention is an optical system for the attenuation of laser light for measurement purposes comprising four logical subassemblies including a first attenuator subassembly for the attenuation of high power laser light received from the first attenuator subassembly, a second subassembly for lower power attenuation of the laser light, a lens subassembly for collecting beam size data simultaneously at multiple locations in space, and a fourth subassembly including any beam measuring apparatus, such as film, or a video camera having a video chip for recording the beam size data received from the lens assembly for accurate measurement and analysis of the beam characteristics. The first attenuator subassembly includes a pair of reflecting, opposed facing, fixed wedges. The reflecting wedges are selectively tilted to eliminate interference effects between their inward facing reflecting surfaces. The second attenuator subassembly includes a pair of opposed facing and movable wedges attenuators arranged in series with a fixed filter. The lens subassembly includes a positive optical lens for focusing the beam into a series of beam-splitters which redirect the beam data for simultaneous collection by the beam measuring assembly. The beam measuring assembly preferably also includes a fixed filter disposed in front of its recording surface.

List of advantages

An important advantage of the present invention is that the polarization characteristic of the attenuated beam through the first high power laser light attenuator subassembly is almost the same as the original incoming beam since the angles and separation of the two wedge attenuators is chosen near to normal so both polarizations can be reflected as equally as desired.

Another advantage of the present invention is that the beam's transverse dimensions after passage through the first attenuator subassembly are not affected in any way, as in the prior art, since the attenuation is obtained by reflection from high quality plane surfaces.

These and other objects and advantages of the present invention will no doubt become apparent to those skilled in the art from the following drawings, detailed description of the preferred embodiment and the appended claims.

BRIEF DESCRIPTION OF THE DRAWINGS

FIG. 1 is an isometric view of the novel optical system for alternating and sampling laser beams constructed in accordance with a preferred embodiment of the present invention.

FIG. 2 is a top view schematic of the optical system of FIG. 2 illustrating the travel path of the laser light rays.

FIG. 2A is a schematic top plan view of the video chip detector surface taken along the line and in the direction of arrows 2A—2A of FIG. 2.

FIG. 3 is a schematic representation illustrating, in mathematical terms, the minimum tilt angle necessary to eliminate interference effects between two closely spaced optical surfaces S1 and S2 for $L<D$, where L is the distance between the surfaces and D is the laser beam diameter.

FIG. 4 is a schematic representation illustrating, in mathematical terms, the tilt angle necessary for eliminating interference effects between two reflecting surfaces S1 and S2 for $L>D$, where L is the distance between the surfaces and D is the laser beam diameter.

DETAILED DESCRIPTION OF THE PREFERRED EMBODIMENT

FIGS. 1 and 2 show a novel optical system constructed in accordance with one embodiment of the present invention and generally designated by the numeral 1.

The optical system 1 is useful for attenuating and sampling laser beams in a manner such that the intensity variation of the original beam is preserved to permit accurate recording and measurement of the laser beam properties. While the preferred application of the invention is for attenuating laser light, it is understood that the invention is useful for attenuating and measuring beam characteristics of many ordinary light sources including but not limited to light from fluorescent tubes, tungsten-halogen bulbs, incandescent bulbs, mercury arc lamps, etc.

The optical system 1 preferably comprises four distinct logical subassemblies including a first attenuator subassembly 10 for non-absorbing attentuation of high power laser light, a second attenuator subassembly 20 for absorbing attenuation of low power laser light, a third lens subassembly 30 for focusing and splitting attenuated laser light at multiple positions in space, and a forth logical subassembly 40 for collecting the laser beam data so that the laser beam properties can be accurately measured.

The first attenuator subassembly 10 includes two wedged reflectors 11 and 12 having equal but oppositely arranged orientations and each having respective inward facing reflecting surfaces 13 and 14 which direct the laser beam (indicated as rays in the Figure) to pass through the first attenuator subassembly 10 without angular deviation. The non-reflected laser light may continue to be used in normal fashion while the attenuator (wedged reflectors 11 and 12) is in place and beam intensity measurements are being made. Alternatively, as generally indicated in phantom by numeral 15 in FIGS. 1-2, any known safe means for trapping and dissipating the beam may be provided.

The wedged reflectors 11 and 12 of the first logical attenuator subassembly 10 provide non-absorbing attenuation by reflection from essentially lossless optical materials. In the UV to Near-IR wavelength region, one material of choice would be high quality fused Silica such as Supersil TM or Dynasil TM. Other low-loss optical materials would be chosen for other wavelength regions. If it were necessary to have greater attenuation, for higher power lasers for example, it will be appreciated by those of ordinary skill in the art that more reflectors could be used, or that dielectric coatings (to reduce the reflections) could be added. It is to be noted that the use of uncoated reflectors have the advantage of covering a broader wavelength range.

Another feature of the arrangement shown is that the polarization characteristic of the attenuated beam is almost the same as the original beam since the angles and separation of wedges 11 and 12 may be chosen near to normal so both polarizations can be reflected as equally as desired.

A further advantage is that the laser beam's transverse dimensions are not affected in any way, as is typical in the prior art, since the attenuation is obtained by reflection from high quality plane surfaces.

The second logical subassembly 20 of the optical system 1 is fashioned as an attenuator which uses wedged pieces 21 and 22 fabricated from an absorbing glass. In the preferred embodiment neutral density glass is used, but it is understood any absorbing glass for a specific wavelength may be used. Wedge pieces 21 and 22 are movable in the direction as shown by the arrows to provide continuous adjustment of attenuation over a range of neutral densities (hereinafter "N.D.") in a desired range of ordered magnitude, such as for example N.D. 1.0 to N.D. 5.0.

The pair of translating absorbing glass wedges are used to cause uniform variable attenuation. As the matched wedges translate in the direction of the wedge, the total glass thickness is changed. A beam of light transmitting through the pair of wedges will be attenuated identically across the beam in proportion to the total thickness of absorbing material. Where the wedges overlap just slightly, the thickness will be minimum and the transmittance will be the highest; at maximum overlap the glass is thickest and transmittance will be smallest. In other words, absorption varies with total glass thickness (i.e., the thickness of both glass wedges in the region of the optical path). Those skilled in the art will appreciate that different glass pieces having different absorptions per unit thickness may be selected.

The absorbing glass may produce the same absorption for each wavelength which is often called a neutral density (N.D.) filter glass. The glass should be free of bubbles, striae, and scratches, and it should have the absorbing material uniformly distributed. In addition, surface figure and wedge angles need to be controlled to produce uniform attenuation across the optical beam.

By selectively arranging the two matched wedges 21 and 22 back and forth in a direction transverse to the laser beam in the manner as shown in FIGS. 1-2 the relative intensity distribution across the beam is not disturbed. Alternatively the wedge filters 21 and 23 may be removed to give a total range of attenuation from N.D. 0.0 to N.D. 5.0.

To avoid interference effects these two wedges are also tilted in the direction indicated by arms A—A and A'—A' so there are no parallel surfaces. (This is discussed in more detail with reference to FIG. 3 below.) In the preferred embodiment, the rotation or tilt of each wedge 21 and 22 is about its respective axis of lateral adjustment indicated generally by direction arrows B—B and B'—B' in this particular design. As is well known, it could be in other axes and accomplish the same purpose.

In addition to the variable wedge attenuators 21 and 22, a removable fixed filter 23 may be provided so that a step attenuation of N.D. 2.0. is available. This extends the useful range of the continuously adjustable N.D. 1.0 to N.D. 5.0 attenuator to cover a total range of N.D. 1.0 to N.D. 7.0 in a continuous fashion. While in the preferred embodiment a step attenuation of N.D. 2.0 is described, it is understood that the invention is not so limited and any desired step attenuation may be used. This is superior to the prior art which requires a much greater number of fixed attenuators to cover the same range. Also, the fixed step attenuators of the prior art do not allow the use of the full dynamic range of the detector for lasers of certain power levels.

This combination covers the entire useful range between the maximum power that absorbing attenuators can handle without distorting the beam (about 0.1 watt/mm$^2$) and the lower level of laser power of practical interest (about 10 microwatts/mm$^2$) with a minimum of attenuators. One continuous wedged attenuator pair to cover such a large range would be inconveniently large in size. It is understood that other materials and higher power densities including but not limited to sapphire, silicon, and germanium can be used at other wavelengths.

For a fixed filter 23 of N.D. 2 or more, the fixed filter 23 may be made without wedge angles since the internal attenuation reduces the interference effects below 1 percent.

Upon exiting the second attenuator subassembly 20, the laser beam enters the third logical subassembly 30 wherein it is brought to a focus with a positive lens 31 and then intercepted by a plurality (three in the example shown) of beam-splitters 32-33. After traveling from the lens 31 to the first beam-splitter 32, a small portion of the light is reflected from the first forward facing beam-splitter surface 32a, and if desired, from the second rear beam-splitter surface 32b, to the data plane of measurement (in this example a beam measuring assembly 41 of the fourth logical subassembly 40). Most of the light from beam-splitter 32 passes on to beam-splitters 33, and 34 and other samples of the beam are reflected to the measurement plane, 41. To appropriately measure pulse lasers, three beam-splitters are required, however it is understood that more beam-splitters may be employed if desired.

It is well known that a laser's beam width in the vicinity of the focus of a lens is directly related mathematically to the minimum diameter and propagation characteristic of the laser itself.

The basic parameters that completely describe the propagation characteristic and focusability of a laser beam are: its effective minimum beam width; location of the effective minimum beam width; and the angular divergence of the beam. Alternatively, instead of the actual divergence, a dimensionless "propagation factor" or "quality factor" can be used. This is a ratio of the actual divergence to the best theoretical divergence.

In principle, measurement of three beam diameters, and their locations, is all that is required to completely characterize the laser beam.

By using a focusing lens and beam splitters it is possible to direct three beams (or more if desired) from around the lens focus to different sections of a "measurement plane" where a piece of film, a video chip, or other beam measuring equipment is placed. From this it is possible to completely characterize the laser beam from a single frame of data. This also means that the propagation properties of one single pulse of laser light can be measured.

From FIGS. 1-2 it is evident that the path length over which the beam travels from the lens to the measurement plane is different for each of the beam splitter surfaces. The points of focus from each surface reflection from beam-splitter surfaces 32a, 32b, 33a, 33b, 34a and 34b are shown as dots numbered 32c, 32d, 33c, 33d, 34c and 34d, respectively. This is best seen in FIG. 2.

The beam-splitters 32-34 all are shown as wedges so that there are no interference effects from overlap of the reflections from forward and rear reflecting surfaces, and so that two beams can be obtained from each splitter.

One side of the beam-splitters may also be provided with an anti-reflection coating if desired. However, the wedge angles may be chosen so that the two reflected beam portions from each beam-splitter surface are sufficiently separated so that anti-reflection coatings are not needed. But, coatings may be desired in the case where a large number of beam splitters are to be employed, and where the light lost from the unused reflections leaves too little light from the later reflections.

There is another reason to consider special coatings for the beam-splitter surfaces. The beams 44 at the measurement plane 41 have about the same total energy but are of different sizes, thus the peak intensity of the beams at the measurement plane vary. To utilize the maximum intensity range of the beam measurement equipment it is desirable that the peak intensities at the measurement plane be about the same.

In order to achieve similar peak values for each of the beam samples the beam-splitters may be coated so that the smaller beams have less reflection or alternatively, the larger beam samples have more reflection. Alternatively, additional small attenuators may be selectively placed to intercept one or more of the individual beams reflected from the beam-splitter surfaces. An example attenuator is shown in FIG. 2 and indicated as number 36 and is positioned in front of focal point 32d of reflective beam-splitter surface 32b.

If either the thickness of the beam-splitters or the angle of incidence is too large, there will be astigmatic distortion of the beam. To minimize this effect the angle of incidence and the wedge thicknesses should be made as small as possible. For very thin beam-splitters only one surface reflection would be useful. The direction of the wedge formations for the successive beam-splitters 32-34 should be alternated as shown in FIG. 2. in order to minimize these distortions.

The fourth and final logical subassembly 40 of the optical attenuation system 1 includes a fixed filter 42 attached directly to a beam measuring assembly 41. In the preferred embodiment the beam measuring assembly is a video chip camera assembly, but it is understood that any other known types of beam measuring apparatus may be used, including but not limited to CCD chip, vidicon tube, discrete detector element arrays and scanning aperture methods such as pin hole slit, knife edge or encircled energy scan aperture methods.

The preferred filter is chosen to exclude stray light from the chip. It is also tilted at an angle to prevent interference effects between the chip surface and the inward facing surface of the filter/attenuator 42. The light intensity information of the reflected beams from the beam-splitters 32-42 is collected at the light receiving surface 41b of the beam measurement plane 41a as is best seen in FIG. 2A. The six collected light beams are generally designated as numeral 44.

The typically available video chips are much more sensitive than required for measurements of lasers. A major inconvenience has been the necessity to work in dark rooms while using the chips and cameras as normally supplied. The placement of the appropriate part of the required attenuation on the chip itself permits operation in normal room light and further protects the fragile chip from damage and dust.

For laser measurement purposes it is common to remove the normal protective cover glasses from video chips to avoid their interference effects. Dust is quite difficult to clean from a chip without destroying the chip, or its tiny connecting wires.

The restoration of a protective cover in combination with the appropriate filter value contributes to the ease of use and robustness of the system.

One essential feature of this system is that all optical surfaces which could produce interference effects have been tilted with respect to each other and with respect to the laser beam. The angles of tilt and wedge chosen are not arbitrary but are selected to achieve minimum tilt and deflection of the beam consistent with preservation of the laser intensity distribution within desired tolerances.

FIG. 3 illustrates how a second surface S2 is tilted to eliminate "fringe effects" which otherwise occur between two closely spaced optical surfaces S1 and S2 where the distance L between two surfaces is much less than the beam diameter D. This situation pertains to the orientation of fixed filter 23 with respect to the wedge attenuator 22 and to the orientation of the light receiving surface 41b with respect to the closely spaced filter 42.

To understand this, consider a beam of a given diameter and wavelength. There is a minimum tilt angle needed between closely spaced surfaces in order to produce an interference pattern that has a very large number of maxima and minima, usually called "fringes". If the number of fringes is made such that several fringes cover the size of the elemental detector aperture, there is an averaging effect so that the interference effect can be reduced as much as necessary. From FIG.

3, the required tilt angle $\theta$ can be expressed by the following mathematical equation:

$$\theta = \arctan[(N \times \lambda)/(D \times 2)]$$

where:
N = number of fringes
$\lambda$ = wavelength
D = beam diameter

As an example, for a 5 mm diameter beam having a 1000 nanometer wavelength, the tilt angle needed to produce 1000 fringes across the beam is:

$$\text{Angle} = \frac{(\text{Wavelength}/2) * \text{Fringes}}{\text{Beam Diameter}} = 0.1 \text{ (radians)}$$

If the elemental detector aperture is 1/100 of the beam diameter then there are 10 fringes included within the detector area, and the measurement variation due to the interference effect is reduced by 10 to 1. For uncoated glass surfaces the 16 percent variations produced by interference are reduced to 1.6 percent.

FIG. 4 illustrates the case where the two reflection surfaces S1 and S2 are spaced a number of beam diameters apart. This corresponds to the light reflection activity occurring between the inward facing reflecting surfaces 13 and 14 of the first attenuator subassembly 10. For this situation, since the spacing between the reflecting surfaces is large, the fringes do not occur and it is only necessary to select the tilt angle such that the second reflection does not overlap the beam at the first reflection surface. The tilt angle $\theta$ for this situation may be expressed mathematically as:

$$\theta = \arctan[D/(2L)]$$

where:
D = beam diameter
L = distance between the reflecting surfaces S1 and S2

In a first alternate embodiment, the first logical subassembly 10 may be omitted from the four subassembly combinations shown in FIG. 7. This embodiment is applicable for the attenuation of low power lights. The optional inclusion of logical subassembly 10 is indicated by the dashed-line box enclosure 10a in FIG. 1.

It should be understood that various modifications within the scope of this invention can be made by one of ordinary skill in the art without departing from the spirit thereof. For example, while the preferred embodiment describes glass attenuators for attenuating light beams, especially laser light beams, the underlying principles of the invention also apply to the attenuation of X-ray beams. For this application, metal attenuators would replace the glass attenuators. We therefore wish our invention to be defined by the scope of the appended claims as broadly as the prior art will permit, and in view of the specification if need be.

We claim:

1. An optical system for the non-distorting attenuation of a light beam while preserving the relative light intensities across the beam to permit accurate measurements of the light beam profile comprising in operative combination:

a) a first attenuation means disposed along a beam optical pathway for non-absorbingly attenuating a high power beam to a lower power level sufficient to avoid thermal distortion of the beam profile upon subsequent attenuation in an absorbing media and without angular deviation of said beam as it passes through said first attenuation deviation of said beam as it passes through said first attenuation means and wherein a polarization characteristic of said beam remains substantially unchanged after attenuation;

b) a second attenuation means disposed adjacent to and down stream of said first attenuation means for absorbingly attenuating the non-absorbingly attenuated beam received from said first attenuation means;

c) an optical lens assembly disposed adjacent to and down stream of said second attenuation means and including a positive lens means and a plurality of beam-splitters oriented in series with said positive lens means, said positive lens means for focusing the attenuated beam received from said second attenuation means into said plurality of beam-splitters such that portions of said beam are reflectively redirected from selective surfaces of each of said beam-splitters for simultaneous collection of said beam portions at a common measurement plane; and d) whereby each of said first attenuation means, said second attenuation means and said lens assembly having optical surfaces selectively tilted so that fringe and interference effects between successive optical surfaces are eliminated.

2. An optical system as in claim 1 wherein said first attenuation means includes:

a) a first wedge reflector having two optical surfaces including a first incoming transmissive surface and a second outgoing reflective surface;

b) a second wedge reflector having two optical surfaces including a first incoming reflective surface and a second outgoing transmissive surface; and c) said first and second wedge reflectors being oriented such that their respective reflective surfaces face each other and wherein said reflective surface of said second wedge reflector is tilted at a minimum angle $\theta$ away from a plane parallel to said reflective surface of said first wedge reflector sufficient to eliminate overlapping reflectivity of light between said first and second wedge reflectors while still maintaining said polarization characteristic of said beam.

3. An optical system as in claim 2 wherein said second attenuation means includes:

a) an assembly of opposed facing neutral density glass wedges disposed along said optical path of said beam, said glass wedge assembly including:

i) a first glass wedge having a first optical surface and a second opposed facing optical surface, said first optical surface oriented to receive incoming light from said second attenuation means;

ii) a second glass wedge having a first optical surface and a second opposed facing optical surface, said first optical surface disposed facing but not parallel to said second optical surface of said first glass wedge;

b) each of said glass wedges being adjustable in a direction transverse to said beam optical path to provide continuous adjustment of a constant thickness path length across the beam for attenuation over a range of about N.D. 1.0 to about N.D. 5.0; and c) each of said glass wedges being selectively tiltable to eliminate interference effects therebetween.

4. An optical system as in claim 3 said second attenuation means further includes:
   a) a removable fixed density filter means having a first optical surface disposed down stream of and facing said second optical surface of said second glass wedge for providing a step attenuation to increase continuous attenuation adjustability over a range from about N.D. 1.0 to about N.D. 7.0; and
   b) said second optical surface of said second glass wedge is tilted at a minimum angle $\theta$ with respect to said first optical surface of said fixed density filter means sufficient to eliminate fringe interference therebetween.

5. An optical system as in claim 1 which includes means for measuring light intensity data of said beam portions reflectively redirected from said beam-splitters.

6. An optical system as in claim 5 wherein said light intensity measuring means includes:
   a) a beam measuring assembly having a light receiving surface; and
   b) a fixed filter disposed adjacent said light receiving surface to provide attenuation of said beam portions received from said beam splitters.

7. An optical system as in claim 6 wherein said fixed filter is tilted at a minimum angle $\theta$ with respect to said light receiving surface of said beam measuring assembly sufficient to eliminate interference effects therebetween.

8. An optical system as in claim 4 which includes means for measuring light intensity data of said beam portions reflectively redirected from said beam-splitters.

9. An optical system as in claim 8 wherein said light intensity measuring means includes:
   a) a beam measuring assembly having a light receiving surface; and
   b) a fixed filter disposed adjacent said light receiving surface to provide attenuation of said beam portions received from said beam splitters.

10. An optical system as in claim 9 wherein said fixed filter is tilted at a minimum angle $\theta$ with respect to said light receiving surface of said beam measuring assembly sufficient to eliminate interference effects therebetween.

11. An optical system as in claim 7 wherein said tilt angle $\theta$ is calculated in accordance with the equation:

$$\theta = \arctan [D/(2L)] \text{ for } L > D$$

where
   D is the beam diameter; and
   L is the distance between successive optical surfaces.

12. An optical system as in claim 7 wherein said tilt angle $\theta$ is calculated in accordance with the equation:

$$\theta = \arctan [(N \times \lambda)/(2D)] \text{ for } D > L$$

where
   N = number of fringes
   $\lambda$ = wave length of beam;
   D = beam diameter
   L = distance between successive optical surfaces.

13. An optical system as in claim 10 wherein said tilt angle $\theta$ is calculated in accordance with the equation:

$$\theta = \arctan [D/(2L)] \text{ for } L > D$$

where
   D is the beam diameter; and
   L is the distance between successive optical surfaces.

14. An optical system as in claim 10 wherein said tilt angle $\theta$ is calculated in accordance with the equation:

$$\theta = \arctan [(N \times \lambda)/(2D)] \text{ for } D > L$$

where
   N = number of fringes
   $\lambda$ = wave length of beam;
   D = beam diameter
   L = distance between successive optical surfaces.

15. An optical system for the non-distorting attenuation of a light beam while preserving the relative light intensities across the beam to permit accurate measurements of the light beam profile comprising in operative combination:
   a) attenuation means disposed along a beam optical pathway for absorbingly attenuating a light beam received from an existing light source without thermal distortion of the beam profile;
   b) an optical lens assembly disposed adjacent to and down stream of said attenuation means and including a positive lens means and a plurality of beam-splitters oriented in series with said positive lens means, said positive lens means for focusing the attenuated beam received from said attenuation means into said plurality of beam-splitters such that portions of said beam are reflectively redirected from selective surfaces of each of said beam-splitters for simultaneous collection of said beam portions at a common measurement plane; and
   c) whereby each of said attenuation means and said lens assembly having optical surfaces selectively tilted so that fringe and interference effects between successive optical surfaces are eliminated.

16. An optical system as in claim 15 wherein said attenuation means includes:
   a) a pair of opposed facing neutral density glass wedges disposed along said optical path of said beam including:
      i) a first glass wedge having a first optical surface and a second opposed facing optical surface, said first optical surface oriented to receive incoming light from said second attenuation means;
      ii) a second glass wedge having a first optical surface and a second opposed facing optical surface, said first optical surface disposed facing said second optical surface of said first glass wedge;
   b) each of said glass wedges being adjustable in a direction transverse to said beam optical path to provide continuous adjustment of a constant thickness path length across the beam for attenuation over a range of about N.D. 1.0 to absorb N.D. 5.0; and
   c) each of said glass wedges being selectively tiltable to eliminate interference effects therebetween.

17. An optical system as in claim 16, said attenuation means further includes:
   a) a removably fixed density filter means having a first optical surface disposed down stream of and facing said second optical surface of said second glass wedge for providing a step attenuation to increase continuous attenuation adjustability over a range from about N.D. 1.0 to about N.D. 7.0; and
   b) said second optical surface of said second glass wedge is tilted at a minimum angle $\theta$ with respect to said first optical surface of said fixed density filter means sufficient to eliminate fringe interference therebetween.

18. An optical system as in claim 15 which includes means for measuring light intensity data of said beam portions reflectivity redirected from said beam-splitters.

19. An optical system as in claim 18 wherein said light intensity measuring means includes:
 a) a beam measuring assembly having a light receiving surface; and
 b) a fixed filter disposed adjacent said light receiving surface to provide attenuation of said beam portions received from said beam splitters.

20. An optical system as in claim 19 wherein said fixed filter is tilted at a minimum angle $\theta$ with respect to said light receiving surface of said beam measuring assembly sufficient to eliminate interference effects therebetween.

21. An optical system as in claim 17 which includes means for measuring light intensity data of said beam portions reflectively directed from said beam-splitters.

22. An optical system as in claim 21 wherein said light intensity measuring means includes:
 a) a beam measuring assembly having a light receiving surface; and
 b) a fixed filter disposed adjacent said light receiving surface to provide attenuation of said beam portions received from said beam splitters.

23. An optical system as in claim 22 wherein said fixed filter is tilted at a minimum angle $\theta$ with respect to said light receiving surface of said beam measuring assembly sufficient to eliminate interference effects therebetween.

24. An optical system as in claim 20 wherein said tilt angle $\theta$ is calculated in accordance with the equations:

$$\theta = \arctan[(N \times \lambda)/(2D)] \text{ for } D > L; \text{ and}$$

$$\theta = \arctan[D/(2L)] \text{ for } L > D$$

where
 N = number of fringes
 $\lambda$ = wave length of beam;
 D = beam diameter
 L = distance between successive optical surfaces.

25. An optical system as in claim 23 wherein said tilt angle $\theta$ is calculated in accordance with the equations:

$$\theta = \arctan[(N \times \lambda)/(2D)] \text{ for } D > L; \text{ and}$$

$$\theta = \arctan[D/(2L)] \text{ for } L > D$$

where
 N = number of fringes
 X = wave length of beam;
 D = beam diameter
 L = distance between successive optical surfaces.

26. An optical attenuator for receiving a light beam along an optical path and for absorbingly attenuating the light beam comprising in operative combination:
 a) an assembly of opposed facing absorbing glass wedges of the kind wherein light absorption varies with total glass thickness, said glass wedges disposed along said optical path of said beam and including:
  i) a first glass wedge having a first optical surface and a second opposed facing optical surface, said first optical surface oriented to receive incoming light along an optical path;
  ii) a second glass wedge having a first optical surface and a second opposed facing optical surface, said first optical surface disposed facing said second optical surface of said first glass wedge;
 b) each of said glass wedges being adjustable in a direction transverse to said beam optical path to provide continuous adjustment of a constant thickness path length across the beam for attenuation over a range of about optical density 1.0 to about optical density 5.0; and
 c) each of said glass wedges being selectively tiltable to eliminate interference effects therebetween.

27. An optical attenuator as in claim 26 which further includes:
 a) a removable fixed density filter means having a first optical surface disposed down stream of and facing said second optical surface of said second glass wedge for providing a step attenuation to increase continuous attenuation adjustability over a range from about optical density 1.0 to about optical density 7.0; and
 b) said second optical surface of said second glass wedge is tilted at a minimum angle $\theta$ with respect to said first optical surface of said fixed density filter means sufficient to eliminate fringe interference therebetween.

28. An optical system as in claim 27 wherein said tilt angle $\theta$ is calculated in accordance with the equation:

$$\theta = \arctan[(N \times \lambda)/(2D)] \text{ for } D > L$$

where
 N = number of fringes
 $\lambda$ = wave length of beam;
 D = beam diameter
 L = distance between successive optical surfaces.

29. A method for attenuating a light beam while preserving relative distribution of light intensities across the beam for performing accurate measurements of the beam comprising in operative sequence the steps of:
 a) attenuating without absorbing a high power light beam having a power level which causes thermal distortion of the beam profile in an absorbing media to a desired low power level having a power level below which said thermal distortion is present and without angular deviation of said beam by reflecting from essentially lossless optical materials such that a polarization characteristic of said beam remains substantially unchanged;
 b) using a pair of opposed facing neutral density glass wedges for absorbing attenuation of the beam after it has been attenuated to said desired lower power level;
 c) using an optical assembly for trapping and splitting the beam after the absorbing attenuation of the beam for simultaneous collection of split portions of the beam at a measurement plane; and
 d) selectively tilting all optical surfaces of said lossless optical materials, said glass wedges and said optical assembly at minimum angles with respect to each other and said beam sufficient to eliminate fringe and interference effects between successive optical surfaces.

30. A method for attenuating a light beam as in claim 29 which includes the step of:

a) adjusting the position of each of said neutral density glass wedges with respect to said beam to provide continuous adjustment of attenuation over a range of about N.D. 1.0 to about N.D. 5.0.

31. A method for attenuating a light beam as in claim 30 including the step of:
 a) placing a removable fixed density filter between said pair of glass wedges and said optical assembly to provide a step attenuation to increase the useful range of continuous adjustability of said glass wedges.

32. A method for attenuating a light beam as in claim 31 which includes the steps of:
 a) using a light sensitive beam measuring assembly as the measurement plane;
 b) attaching a filter to said beam measuring assembly for attenuating the beam portions before collection on said beam measuring assembly; and
 c) tilting said filter with respect to said beam measuring assembly to eliminate interference effects therebetween.

* * * * *